Dec. 30, 1924.
J. S. MORGAN
1,521,549
METHOD OF PRODUCING CHEMICAL REACTIONS BY ACTION OF HEAT
Filed Oct. 1, 1921
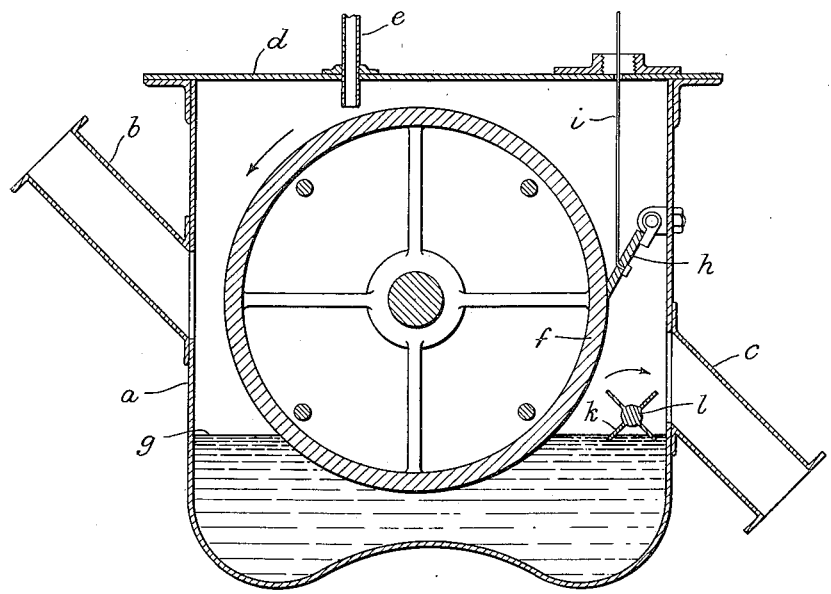
Inventor
John Stanley Morgan
By
[signature]
Attorney Patented Dec. 30, 1924.

1,521,549

UNITED STATES PATENT OFFICE.

JOHN STANLEY MORGAN, OF LONDON, ENGLAND.

METHOD OF PRODUCING CHEMICAL REACTIONS BY ACTION OF HEAT.

Application filed October 1, 1921. Serial No. 504,710.

*To all whom it may concern:*

Be it known that I, JOHN STANLEY MORGAN, a subject of the King of Great Britain, residing in London, England, have invented a certain new and useful Improved Method of Producing Chemical Reactions by Action of Heat, of which the following is a specification.

This invention relates to an improved method of bringing about chemical reactions by heating together two or more substances in a so-called fusion process. Comparatively few processes of this kind can at present be carried out in a continuous operation and generally the process is intermittent, consisting either in heating a considerable quantity of a mixture at one operation, or, when one of the bodies is liquid at the temperature used, in introducing into a considerable quantity of this liquid small doses of the other body or bodies. There are several disadvantages in these intermittent processes, connected with the difficulty in heating the whole of a considerable quantity of the mixture at the same time to the requisite temperature, with the prolonged sojourn of the product in the heated zone and in contact with hot reagent which may be present in excess, and with the dilution of bodies which have not reacted by products which have been formed.

To illustrate the point, reference may be made to the usual manufacture of synthetic phenol by the interaction of fused caustic soda and sodium benzene-sulphonate. The caustic soda is fused in a large cast iron pan provided with agitating gear. The sodium salt is added in small quantities at a time, and the first portions are rapidly converted into sodium phenate. As the caustic soda enters into reaction and becomes more diluted with the various products of the reaction the main change becomes much slower, since it is proportional to the product of the concentration of caustic soda and benzenesulphonate, with the result that the sodium phenate first formed is subjected to prolonged heating in presence of caustic soda and sodium sulphite, which depreciates the yield of phenol. Further, since the reaction becomes very slow towards the end it is not usual to push it to completion so that there is a further loss due to unchanged sulphonate passing out of the system. If it were practicable to introduce the caustic soda and sodium benzenesulphonate into a small reaction vessel in exactly equivalent proportions, the reaction would then always occur at its maximum possible rate and the products of the reaction would be removed from the destructive action of the fused mixture and cooled as soon as formed.

By this invention, reactions of the kind in question are brought about by causing the mixture of substances that are to react to travel upon the surface of or through a molten metal or alloy heated to the required temperature. The quantity travelling and the rate of travel are to be so adjusted that the reaction is sufficiently complete by the time the material issues from the bath. A convenient mode of operating takes advantage of the fact that if the mixture is fed to a surface which is entering the bath and is not wetted thereby, it will travel with the surface, in the form of a thin layer or film through the metal and will emerge when the surface emerges. For instance, the mixture may be fed on to the surface of heated molten metal and carried below the surface by means of a rotating drum to which it will remain applied until the surface of the drum emerges from the metal. This method and an apparatus therefor are described and illustrated in my application for U. S. Patent, Serial No. 490,650, filed August 8, 1921. The speed of the drum is adjusted so that the mixture remains in contact with the hot metal until the desired reaction is complete or as nearly complete as can be. When the product adheres to the drum it can be removed from the emerged surface by a scraper or otherwise; if it does not so adhere it may be removed as quickly as may be desirable from the surface of the metal.

By the invention there may be attained a continuous process, an improved yield, and a purer product, while overheating both of the containing vessel and the product is avoided with comparative ease and there is economy in the transmission of heat.

The method of heating a substance by causing it to travel upon the surface or beneath the surface of molten metal is in itself known; its advantages for the purpose of this invention have not, however, been recognized hitherto.

The invention is illustrated by the following examples and with reference to the accompanying drawing which shows a vertical cross-section of an apparatus suitable for use in carrying out the process.

1. Referring to the drawing, $a$ is a still provided with an inlet pipe $b$ and an exit pipe $c$ and having a cover $d$ provided with an inlet pipe $e$. The ends of the still carry bearings for the shaft of a hollow drum $f$, which is formed preferably of mild steel or of machined cast iron. The still contains molten metal, preferably lead, to the level $g$ and is kept heated to about 320° C. by any suitable mode of heating.

Benzene sulphonic acid is fed into the still through the pipe $b$ and fused caustic soda through the pipe $e$, the rates of flow being so adjusted that the two constituents are present in the still in the ratio of one molecular proportion of benzene sulphonic acid to two molecular proportions of caustic soda. The drum is rotated in the direction of the arrow by suitable mechanism (not shown) and the mixture is carried through the molten lead as a thin layer between the drum and the lead. The rate of revolution of the drum being such that the mixture on it is in contact with the lead for 15–30 seconds, the yield of sodium phenate is considerably better than that obtained by the known processes. The mixture which emerges from the lead in part adheres to the drum, from which it is removed by the scraper $h$ which may be put into or out of operation by means of a rod or handle $i$ extending through the cover $d$ of the still and in part floats on the surface of the lead from which it is caused to leave the still through the exit pipe $c$ by vanes $k$ on a shaft $l$ which is rotated in the direction of the arrow by any suitable means (not shown). The product is then treated in known manner for isolation of phenol.

2. When the fusion process consists in heating a material with a metal and it is feasible to use that metal as the bath, this invention is especially applicable. Thus, for making sodium nitrite by fusing sodium nitrate with lead, it suffices to feed powdered sodium nitrate on to the lead bath as described in the preceding example, so that it travels between the surface of the iron drum and the lead. The film of nitrate on the drum is so thin that if the temperature of the bath is about 450° C., 3–5 seconds contact of the nitrate with the lead will have sufficed to produce a mixture of sodium nitrite and lead oxide, which may be scraped from the drum, if necessary, and removed from the surface of the lead to be leached in known manner. Since lead is removed from the bath by the reaction, fresh lead must be added to maintain the level.

Having thus described the nature of the said invention and the best means I know of carrying the same into practical effect, I claim:—

1. A method of bringing about chemical reactions by a fusion process consisting in causing the material which is to undergo reaction to travel in contact with a mass of molten metal heated to the required temperature.

2. A method of bringing about chemical reactions by a fusion process consisting in causing a material composed of a mixture of substances which are to react to travel in contact with a mass of molten metal heated to the required temperature.

3. A method of bringing about chemical reactions by a fusion process consisting in causing the material which is to undergo reaction to travel as a thin layer between molten metal and a surface travelling through the molten metal.

4. A process of making phenol by fusion of benzene-sulphnoic acid with caustic soda consisting in causing the mixed substances to travel in contact with a bath of molten metal.

In testimony whereof I have signed my name to this specification.

JOHN STANLEY MORGAN.